(No Model.)
T. HYATT.
CONCRETE LIGHT FOR BUILDINGS, AREAS, &c.
No. 317,945. Patented May 12, 1885.
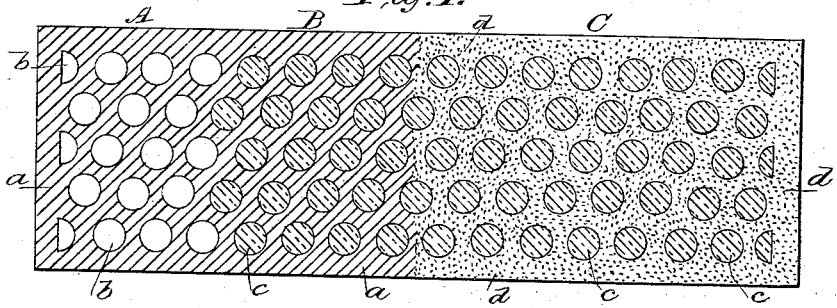
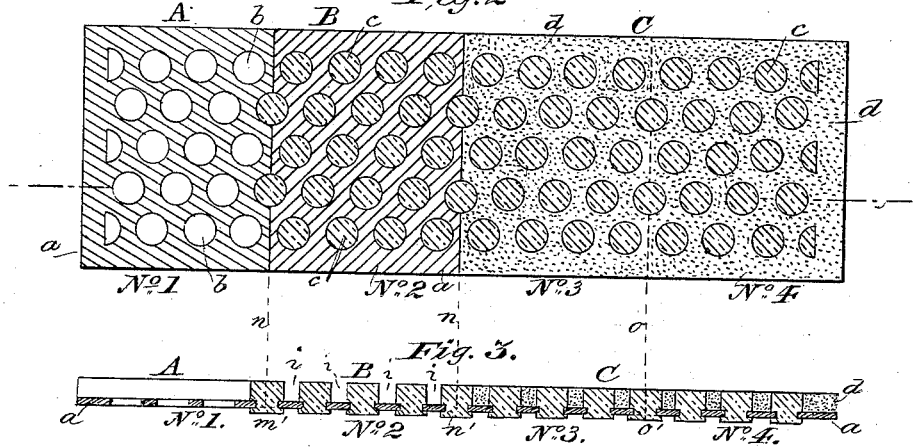
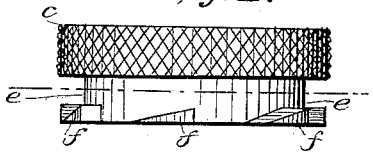
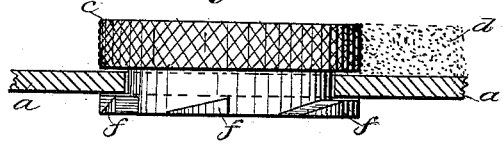
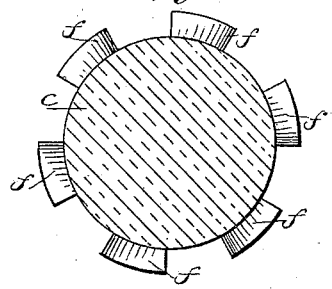
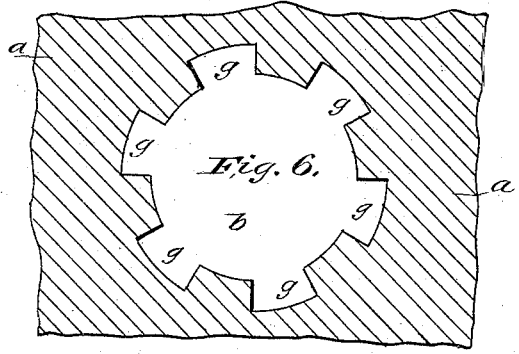
Witnesses:
T. C. Precht
Louis Beyer
Inventor:
Thaddeus Hyatt

United States Patent Office.

THADDEUS HYATT, OF BROOKLYN, NEW YORK.

CONCRETE LIGHT FOR BUILDINGS, AREAS, &c.

SPECIFICATION forming part of Letters Patent No. 317,945, dated May 12, 1885.

Application filed April 7, 1885. (No model.)

*To all whom it may concern:*

Be it known that I, THADDEUS HYATT, a citizen of the United States, residing at Brooklyn, in the county of Kings and State of New York, have invented certain new and useful Improvements in Concrete Lights for Buildings, Areas, &c., of which the following is a specification, reference being had therein to the accompanying drawings.

My invention relates to the manufacture of "concrete lights" for construction purposes, made in the form of "tiles," (including both the "one-casting" and the "combination tile,") and for the closing of coal-holes in sidewalks, made in the shape of "vault-covers." As commonly made the concrete or cement is keyed to the face of the perforated plate or grating by means of under-cut ribs or fillets cast upon the face of the plate, or by means of a cellular mesh cast thereupon; and the glasses are confined therein by the overlayer of cement, or the glasses, prior to the application of the plastic cement facing, are either cemented within rings cast upon the face of the plate or cemented directly within the light-holes of the grating by means of an entering neck or shank upon the glass that goes into the openings, after which the concrete facing is put upon the grating.

The object of my invention is to save the cost of the cellular net-work and fillets on the face of the grating and to avoid the labor of fixation incident to cementing the glasses in position preliminary to the application of the plastic facing.

My invention consists in a perforated plate or grating made with bayonet-slotted light-holes, and glasses formed to interlock with the same, in combination with a plastic or concrete facing that, when hardened, fixes the glasses permanently in place, the sides of the glasses above the top surface of the plate (preferably "milled" or roughened) forming interglass spaces in the nature of retaining-cells to key the plastic to the face of the grating.

My invention consists in the combined elements as combined that constitute this special form of manufactured concrete lights, the perforated plate made with bayonet-slotted light-holes and glasses to match having been previously secured to me by English Patent No. 2,788, dated August 23, 1873, and a concrete-faced grating wherein the glasses form retaining-cells to key the plastic overlayer to the face of the grating having likewise been patented to me by the same patent.

In the accompanying drawings, Figure 1 represents a one-casting tile made according to my improved mode of construction. Fig. 2 represents a combination-tile made according to my improved mode of construction. Fig. 3 is a longitudinal section of Fig. 2, but equally illustrative of Fig. 1. Fig. 4 represents in full size an interlocking glass. Fig. 5 represents the same interlocked with a grating. Fig. 6 represents in full size a bayonet-slotted light-hole in a portion of a perforated plate or grating. Fig. 7 is a bottom plan view of glass, Fig. 4.

A, Fig. 1, indicates a portion of the plate with open light-holes.

B, Fig. 1, indicates a portion of the plate as it appears after the glasses are interlocked with the grating.

C, Fig. 1, indicates a portion of the plate as it appears when, the glasses having been interlocked with the grating, the cement facing has been also added thereto.

A B C, Fig. 2, represent a combination-tile similarly conditioned with Fig. 1, the numbers 1 2 3 4 indicating the fractional gratings that compose the tile. The light-holes of Figs. 1 and 2 being small, no bayonet-slots are represented around the light-holes; but they are to be inferred, these figures being intended to be taken in connection with Fig. 3, where the interlocking bases of the glasses are clearly shown.

A in Fig. 2 indicates fractional grating 1, the light-holes open.

B in Fig. 2 indicates fractional grating 2, set with glasses.

C in Fig. 2 indicates fractional gratings 3 and 4, this portion of the combination-tile being both set with glasses and concreted.

*a* indicates the grating or perforated plate.

*b* indicates light-holes in the grating.

*c* indicates glasses, and also the top portion of the glass.

d indicates concrete.

e indicates the neck or shank portion of the glass.

f indicates the base of the glass and the interlocking cams thereof.

g indicates the bayonet-slots of the light-holes, i i interglass spaces.

m n o in Figs. 2 and 3 indicate junction-lines between fractional gratings 1 2 3 4, composing the combination-tile.

m' n' o' indicate the interlocking glasses that mechanically connect the fractional gratings at the junction-lines.

I will now describe my improved mode of concrete-light manufacture. When the grating is a one-casting tile, as represented by Fig. 1, the light-holes will at the start be all open, as represented at A, Figs. 1, 2, 3, when glasses of the kind illustrated by Figs. 4, 5, 7 will be applied to the same, as shown at B, Figs. 1, 2, 3, 5, the cams f f of the glasses, Figs. 4, 5, and 7, entering and passing through the bayonet-slots g g, Fig. 6, and interlocking with the plate a a, Figs. 3, 5, 6, when the whole surface of the grating will appear as shown at B, Fig. 3, all the glasses being firmly set in position with the interglass spaces i i all open and ready to be filled with the plastic cement. The plastic material is now added, and being smoothly troweled and floated over the face of the work all the interglass spaces are filled with cement, as shown at C, Figs. 1, 2, 3, and made true, level, and flush with the tops of the glasses, as shown at C, Fig. 3, when the work is finished. As soon as the cement becomes set and perfectly hard the glasses are then virtually embedded in stone and remain immovable, so that the glasses not only hold the stone to the grating, but the stone holds the glasses, a sort of "mutual-benefit" arrangement between the "members" composing the partnership.

In describing the mode of manufacture with reference to the one-casting tile I equally describe it with reference to the combination-tile.

Fig. 2 represents a mode of construction where the fractional gratings that compose the combination-tile are supposed to be first placed within the panel-spaces of the structural framework before the glasses and plastic facing are added to the gratings; but, if desired, each one of the fractions 1 2 3 4 may be treated as a one-casting tile and concreted by itself, the interlocking glasses being applied as described, the fractions being afterward joined together in the panel-spaces of the foundation-frame.

One of the advantages connected with the employment of interlocking glasses for combination-tile construction and manufacture is shown in Figs. 2 and 3, where the half-light holes of the fractions at the junction-lines m n o on being closed by the glasses become by the simple act of entering and slightly turning the glasses as complete and virtually whole-light holes as any other in the gratings, the mechanical action of the glasses uniting the fractions into a homogeneous plate equivalent for all practical purposes to a one-casting tile.

The advantage and effect of the milled or roughened sides of the head of the glass with reference to the concrete is shown in Fig. 5, where d, the concrete, is seen to bond with the rough side of the glass.

Having thus fully described and illustrated my invention, what I claim as novel therein, and desire to secure by Letters Patent, is—

1. In illuminating tiling or gratings, the combination, with a metal grating or perforated plate, and concrete overlying the same, of glasses embedded in the concrete and over the openings of the plate, formed with a foot or base having cams thereon to interlock through the openings with the plate, substantially as herein set forth.

2. In illuminating tiling or gratings, the combination, with the underlying grating and overlying concrete, of glasses formed with cams at the base to interlock through the openings with the plate, and with milled or roughened sides to bond with the concrete, substantially as herein set forth.

3. In illuminating tiling or gratings, the combination, with a metal grating or perforated plate, and concrete overlying the same, of flat top glasses embedded in the concrete, and over the openings of the plate, formed with a foot or base having cams thereon to interlock through the openings with the plate, substantially as herein set forth.

4. In illuminating tiling or gratings, the combination, with the underlying grating and overlying concrete, of flat top glasses formed with cams at the base to interlock through the openings with the plate, and with milled or roughened sides to bond with the concrete, substantially as herein set forth.

5. A perforated plate or grating made with bayonet-slotted light-holes, in combination with glasses formed with a foot or base to pass through the same and interlock with the under side of the grating when the grating is combined with a plastic face or overlayer of cement or concrete that on hardening permanently fixes the glasses in place, the sides of the heads of the glasses above the face of the grating at the same time forming interglass spaces or retaining-cells for keying the plastic overlayer to the face of the grating.

6. A perforated plate or grating made with bayonet-slotted light-holes, in combination with glasses formed with a foot or base to pass through the same and interlock with the under side of the grating when the grating is combined with a plastic face or overlayer of cement or concrete that on hardening permanently fixes the glasses in place, the sides of the heads of the glasses above the face of the grating at the same time forming interglass spaces or retaining-cells for keying the plastic overlayer to the face of the grating, in combination with milled or roughened sides upon the glasses, substantially as described.

7. Fractional gratings without dead-work borders on their junction sides, made with bayonet-slotted light-holes, as a new article of manufacture or building material for the construction of combination-tiles and illuminating-surfaces.

8. Combination-tiles composed of fractional gratings without dead-work borders on their junction sides, made with bayonet-slotted light-holes, in combination with glasses formed with an entering base for passing through the slots and interlocking with the under face of the grating, and in combination also with a facing or overlayer of cement or concrete.

9. A combination-tile the fractions of which at the junction-lines are interlocked one with the other mechanically by the action of the glasses, in combination with a facing or over-layer of cement or concrete, substantially as herein set forth and illustrated.

In testimony whereof I affix my signature in presence of two witnesses.

THADDEUS HYATT.

Witnesses:
  THOMAS H. ELLIOT,
  LOUIS BEYER.